(12) United States Patent
Bentz et al.

(10) Patent No.: US 7,761,861 B2
(45) Date of Patent: Jul. 20, 2010

(54) METHOD FOR GENERATING INTERPRETABLE CODE FOR STORAGE IN A DEVICE HAVING LIMITED STORAGE

(75) Inventors: Gregory R. Bentz, Waterloo (CA); John F. A. Dahms, Waterloo (CA); David P. Yach, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 1112 days.

(21) Appl. No.: 10/536,745

(22) PCT Filed: Nov. 29, 2002

(86) PCT No.: PCT/CA02/01841

§ 371 (c)(1),
(2), (4) Date: May 27, 2005

(87) PCT Pub. No.: WO2004/051468

PCT Pub. Date: Jun. 17, 2004

(65) Prior Publication Data

US 2006/0020932 A1    Jan. 26, 2006

(51) Int. Cl.
*G06F 9/45* (2006.01)
(52) U.S. Cl. .................. 717/147; 717/139; 717/140; 717/148; 719/331; 719/332
(58) Field of Classification Search .................. 717/139, 717/140, 147, 148; 719/331, 332
See application file for complete search history.

(56) References Cited

U.S. PATENT DOCUMENTS 6,732,108 B2 * 5/2004 Factor et al. ................. 707/100

2002/0170047 A1 * 11/2002 Swetland .................... 717/162
2004/0015852 A1 * 1/2004 Swetland .................... 717/118

FOREIGN PATENT DOCUMENTS

| EP | 0 913 769 A2 | 5/1999 |
|---|---|---|
| EP | 0 996 059 A2 | 4/2000 |
| EP | 1 207 454 A1 | 5/2002 |
| WO | WO 99/49392 A | 9/1999 |

(Continued)

OTHER PUBLICATIONS

Bob Maatta, Dan Murphy, Building AS/400 Client/Server Applications with Java, Jul. 1999, IBM, International Technical Support Organization, 29 Pages.*

(Continued)

*Primary Examiner*—Hyung S Sough
*Assistant Examiner*—Kimberly Jordan
(74) *Attorney, Agent, or Firm*—Bereskin & Parr LLP/S.E.N.C.R.L., s.r.l.

(57) ABSTRACT

In some embodiments of the present invention, files are generated from java files or class files or jar files. The generated files are directly linkable and interpretable by a Java Virtual Machine. The generated files may be stored in a directly addressable memory of a device. References between class files may appear in the generated files as hard offsets or symbolic references. The generated files may be grouped so that cross-references between generated files in the same group appear as hard offsets.

18 Claims, 6 Drawing Sheets

FOREIGN PATENT DOCUMENTS

WO          WO 9949392 A1 *    9/1999

OTHER PUBLICATIONS

International Preliminary Examination Report Oct. 14, 2004 International Application No. PCT/CA2002/01841.

International Search Report Oct. 1, 2002 International Application No. PCT/CA2002/01841.

Written Opinion Oct. 3, 2004 International Application No. PCT/CA2002/01841.

European Search Report Sep. 9, 2005 Application No. 02 782 563.7-1243.

Office Action for corresponding Canadian patent application CA 2,507,371 dated Oct. 30, 2007.

Third Office Action for corresponding Chinese patent application CN 02829962.0 dated Oct. 19, 2007.

European Search and Examination Report for a related European Patent Application No. EP 07124065.9 dated Mar. 10, 2008.

Second Office Action (and English translation) for corresponding Chinese patent application CN 02829962.0, Office Action dated Mar. 16, 2007.

Office Action (and English translation) for corresponding Chinese patent application CN 02829962.0, Office Action issued Sep. 1, 2006.

Indian Examination Report. Application No. 2303/del np/2005 Date: Mar. 7, 2006.

\* cited by examiner

METHOD FOR GENERATING INTERPRETABLE CODE FOR STORAGE IN A DEVICE HAVING LIMITED STORAGE

BACKGROUND OF THE INVENTION

Java source code files (java files) are compiled into .class files by the Java compiler. These class files may be read into memory by the Java Virtual Machine (VM) in an in-memory format that is suitable for interpretation by the VM. The .class files are then linked with other .class files that have been similarly read. References between .class files are resolved symbolically, using character strings. These character strings appear in both the .class file that contains the definition and in the .class file that references the definition. Therefore, the presence of references between .class files may increase the size of the .class files.

Java .class files may be archived (and optionally compressed) into a .jar file. However, .jar files are not directly interpretable by the Java VM, and the .class files must be extracted (and decompressed, if applicable) from the .jar file (and read into memory) in order for them to be linked, resolved and interpreted by the Java VM.

Although .jar files comprising archived and compressed .class files are smaller than the .class files themselves (and are therefore more suitable for transmission between communication devices), storage space for the extracted (and decompressed, if applicable) .class files needs to be available in the environment where the application is to be executed, so that the Java VM may access the .class files. Consequently, a solution involving .jar files may not represent a savings in storage space. In fact, a solution involving .jar files may require extra storage space, for both the .jar files and the extracted .class files. The extracted .class files need not be retained once they have been loaded into memory, linked and resolved. However, both the .jar file and the in-memory representations of the .class files must be retained. In an environment having limited storage, where storage space is at a premium, it may therefore be preferable to store only the .class files and not to use a solution involving .jar files. However, as explained above, the size of .class files increases when the number of references between .class files increases.

Therefore, it would be beneficial to generate directly interpretable files that are of a smaller size than .class files, while providing a solution for references between .class files.

SUMMARY OF THE INVENTION

In one aspect, an embodiment of the invention provides a device comprising: a memory unit Including executable software; a plurality of class files stored in the memory unit; and, a computing unit connected to the memory unit, the computing unit being able to execute a Java Virtual Machine. The computing unit executes the executable rare for generating a number of cod files from the plurality of class files by combining elements from the plurality of class files without duplication of entries for reducing storage space, wherein the number of cod files is less than the number of class files. A given cod file includes a constant pool created by combining constant pool entries from two or more of the class files without duplication of entries; a byte codes and information structure created by combining byte codes and information structure entries from the two or more of the class files without duplication of entries; and, a fixup table for providing information to the Java Virtual Machine for resolving at least one entry in the given cod file at link time.

In another aspect, an embodiment of the invention provides a method for generating a number of cod files from a plurality of class files by combining elements from the plurality of class files such that the number of cod files is less than the number of class files without duplication of entries for reducing storage space. For a given cod file, the method comprises:

Identifying class files with common entries in at least one of the constant pool and the byte codes and information structure;

generating a constant pool for the given cod file by combining constant pool entries from the class files with common entries without duplication;

generating the byte codes and information structure for the given cod file by combining byte codes and information structure entries from the class files with common entries without duplication; and, generating a fixup table for providing Information to a Java Virtual Machine for resolving at least one entry in the given cod file at link time.

In yet another aspect, an embodiment of the invention provides an article storing executable software that when executed by a computing unit generates a number of cod files from a plurality of class files by combining elements from the plurality of class files without duplication of entries for reducing storage space. The executable software comprises code for generating a given cod file to include a constant pool created by combining constant pool entries from two or more of the class files without duplication of entries; a byte codes and information structure created by combining byte codes and information structure entries from the two or more of the class files without duplication of entries; and, a fixup table for providing information to a Java Virtual Machine for resolving at least one component of the given cod file at link time.

In each of these aspects, the given cod files may further include a sibling list for listing other related cod files to define a sibling group and the fixup table of the given cod file includes indices to the other related cod files specified in the sibling group.

BRIEF DESCRIPTION OF THE DRAWINGS

The subject matter regarded as the invention is particularly pointed out and distinctly claimed in the concluding portion of the specification. The invention, however, both as to organization and method of operation, together with objects features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures and components have not been described in detail so as not to obscure the present invention.

Figure 1A:
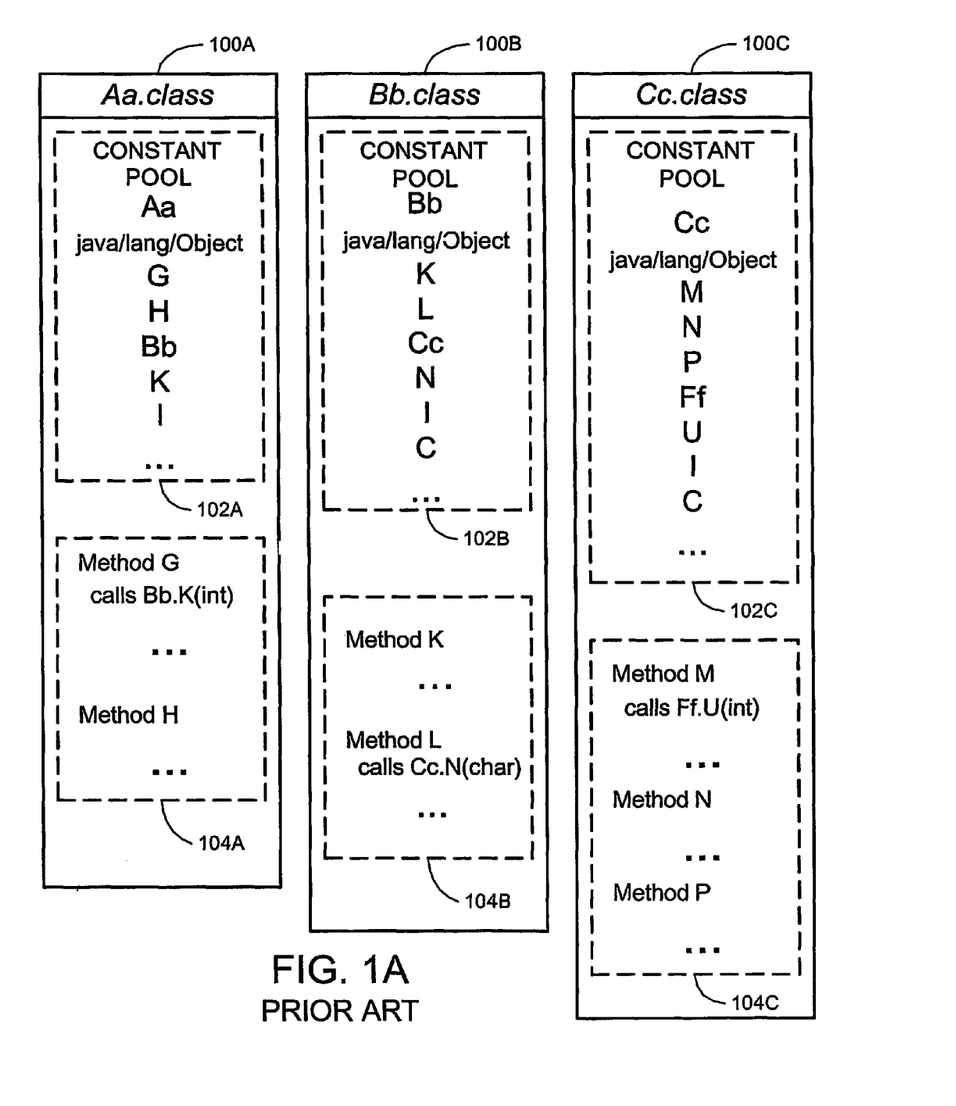
FIGS. 1A and 1B are simplified prior art illustrations of six exemplary .class files.
Figure 1B:
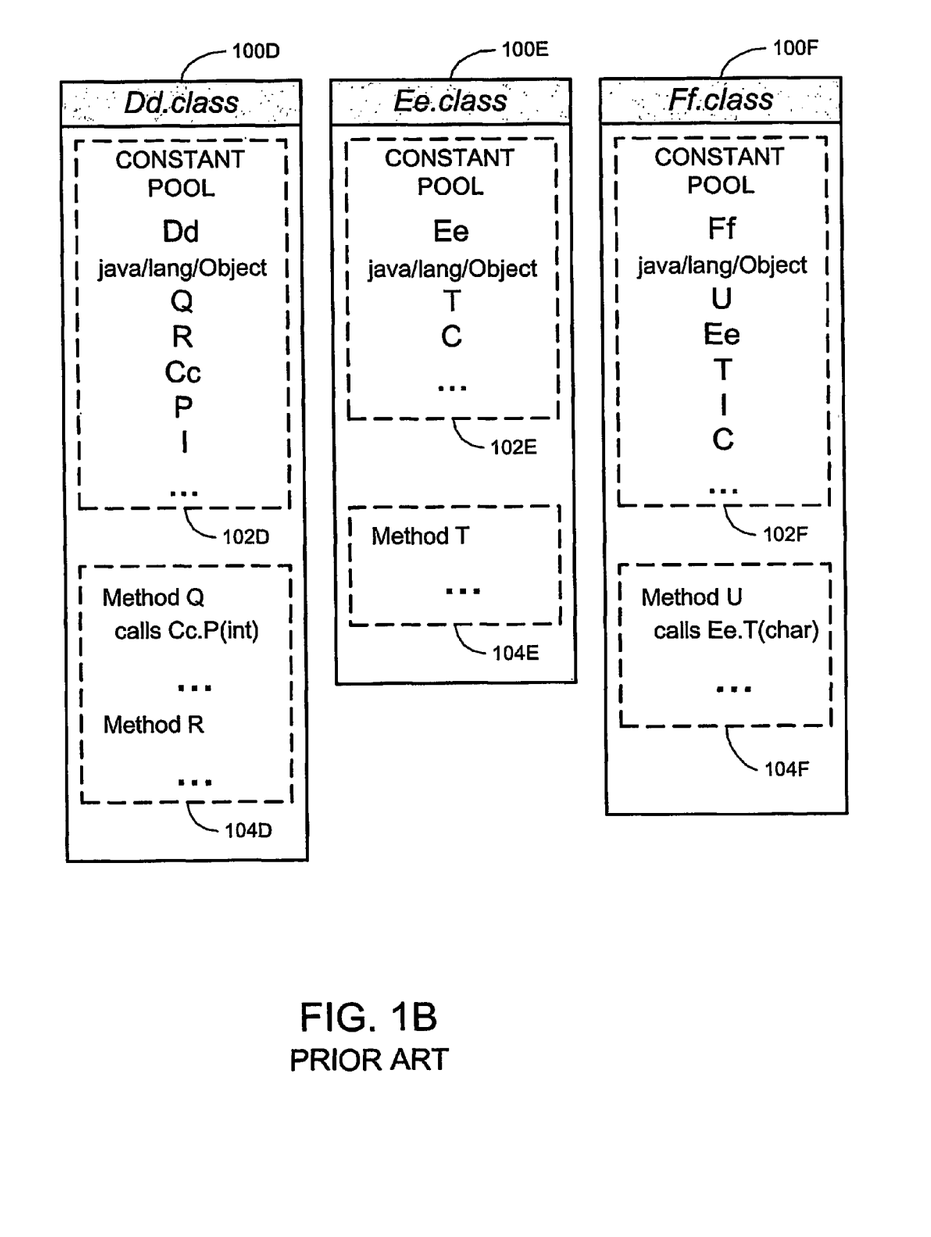

Java source code files (.java files) are compiled into .class files by the Java compiler. These .class files, once read into memory, may be linked, resolved and interpreted by the Java Virtual Machine (VM). FIGS. 1A and 1B are simplified prior art illustrations of six exemplary .class files—Aa.class file 100A, Bb.class file 100B, Cc.class file 100C, Dd.class file 100D, Ee.class file 100E, and Ff.class file 100F, collectively referred to as file 100.

The structure of the .class file is well-documented and will not be described here in detail. File 100 is illustrated in a simplified format for clarity of explanation, however it will be understood by persons of ordinary skill in the art that this simplified format is not an exact representation of the structure of file 100. Each file 100 comprises a constant pool 102. Constant pool 102 comprises indexed cp_info entries, some of which comprise character strings indicating the names of the class and parent class, the names of methods, the type of methods, the names of fields, the type of fields, etc. referred to within the ClassFile structure. Each file 100 also comprises "byte codes and information structures" 104 regarding the class properties, the methods, fields and attributes of the class, and their types. These structures may point to entries in constant pool 102 using ordinal index numbers.

In Aa.class file 100A, Method G includes a reference to another method, Method K, found in class Bb. In fact, Method G is defined in the .class file as a method_info structure comprising, among other things, indices of entries in constant pool 102A. However, for clarity of description, the definition of Method G and its reference to Method K are shown in FIG. 1A in a simplified format. Therefore, the character strings "K" and "Bb" are included in constant pool 102A. The inclusion of "K" and "Bb" in constant pool 102A actually appear as part of several cp_info structures. However, for clarity of description, only the character strings "K" and "Bb" are shown in FIG. 1A. Since the argument of Method K is of type integer, the BaseType character "I" is included in constant pool 102A. The symbolic reference to Method K by Method G in the byte codes and information structures 104A comprises the indices of the relevant cp_info structures in constant pool 102A.

Similarly, in Bb.class file 100B, Method K is defined in class Bb, so constant pool 102B includes all the strings "Bb", "K" and the BaseType character "I" (representing the 'int' type).

Figure 2A:
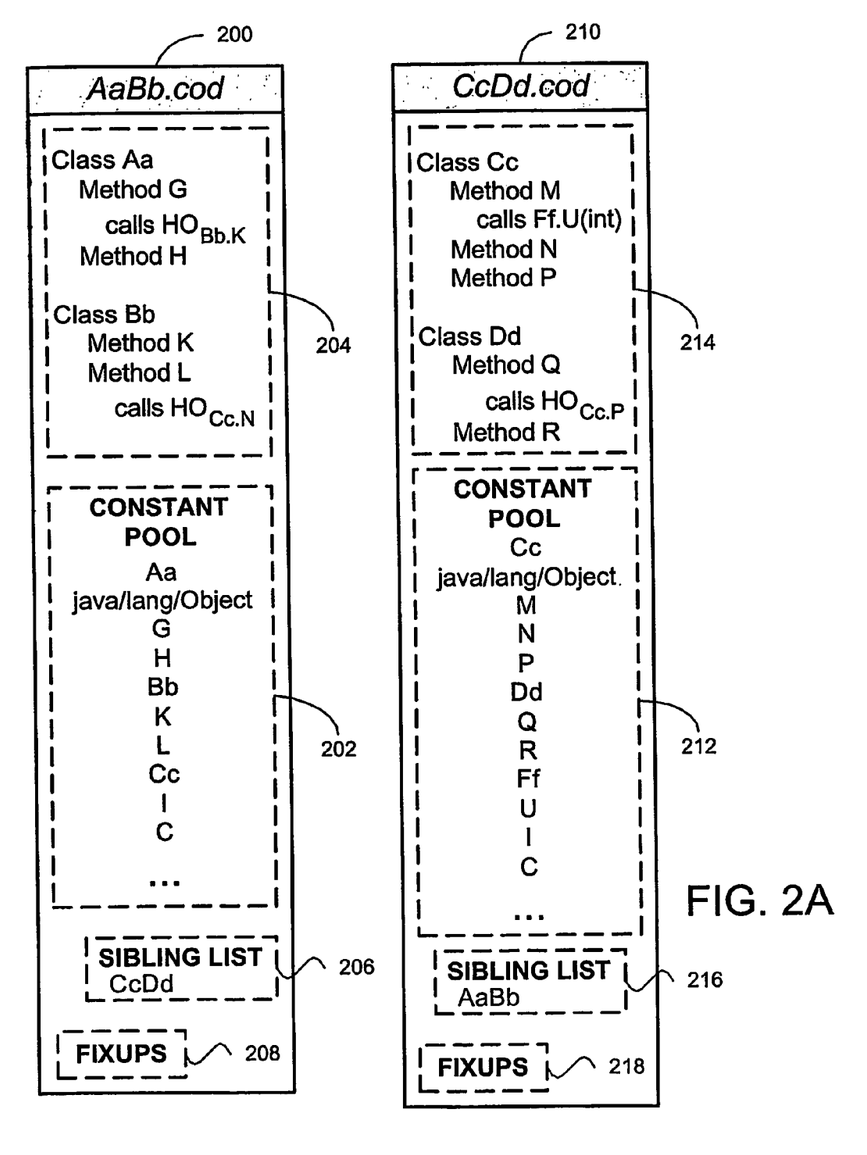
FIGS. 2A and 2B are simplified illustrations of exemplary .cod files, according to some embodiments of the present invention.
Figure 2B:
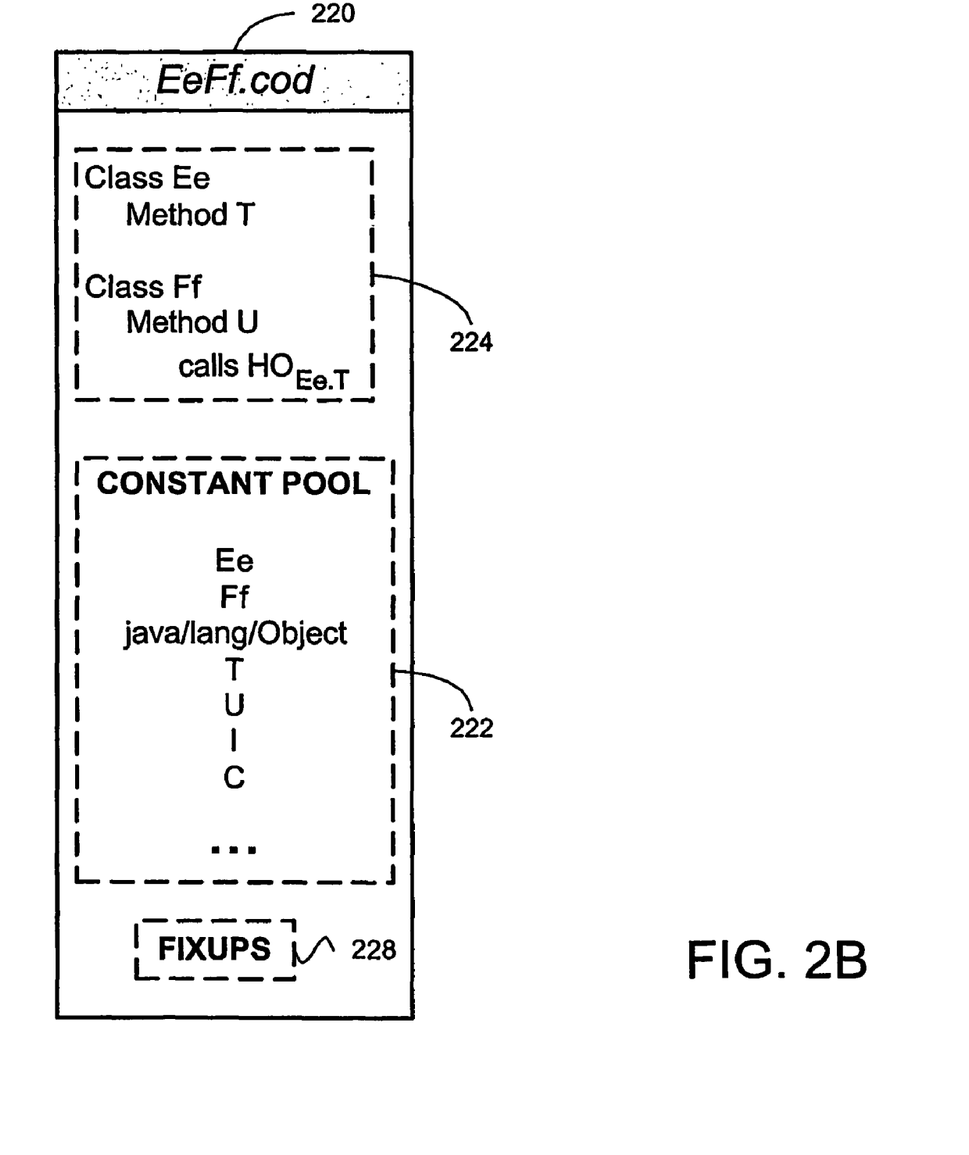

FIGS. 2A and 2B are simplified illustrations of exemplary, .cod files, the generation of which will be described hereinbelow with respect to FIG. 3. .cod files are directly interpretable files that comprise the information of .class files in a manner that requires less storage space than the class files themselves. .cod files may be "solo" .cod files or "sibling" .cod files, as will be explained in greater detail hereinbelow.

In the example shown in FIG. 2B, solo .cod file 220 is named "EeFf.cod", to signify that it results from combining the files Ee.class and Ff.class, although the scope of the present invention is not limited in this respect. Solo EeFf.cod file 220 comprises a constant pool 222, one or more fixup tables 228, and "byte codes and information structures" 224 regarding the class properties, the methods, fields and attributes of the class, and their types.

Figure 3:
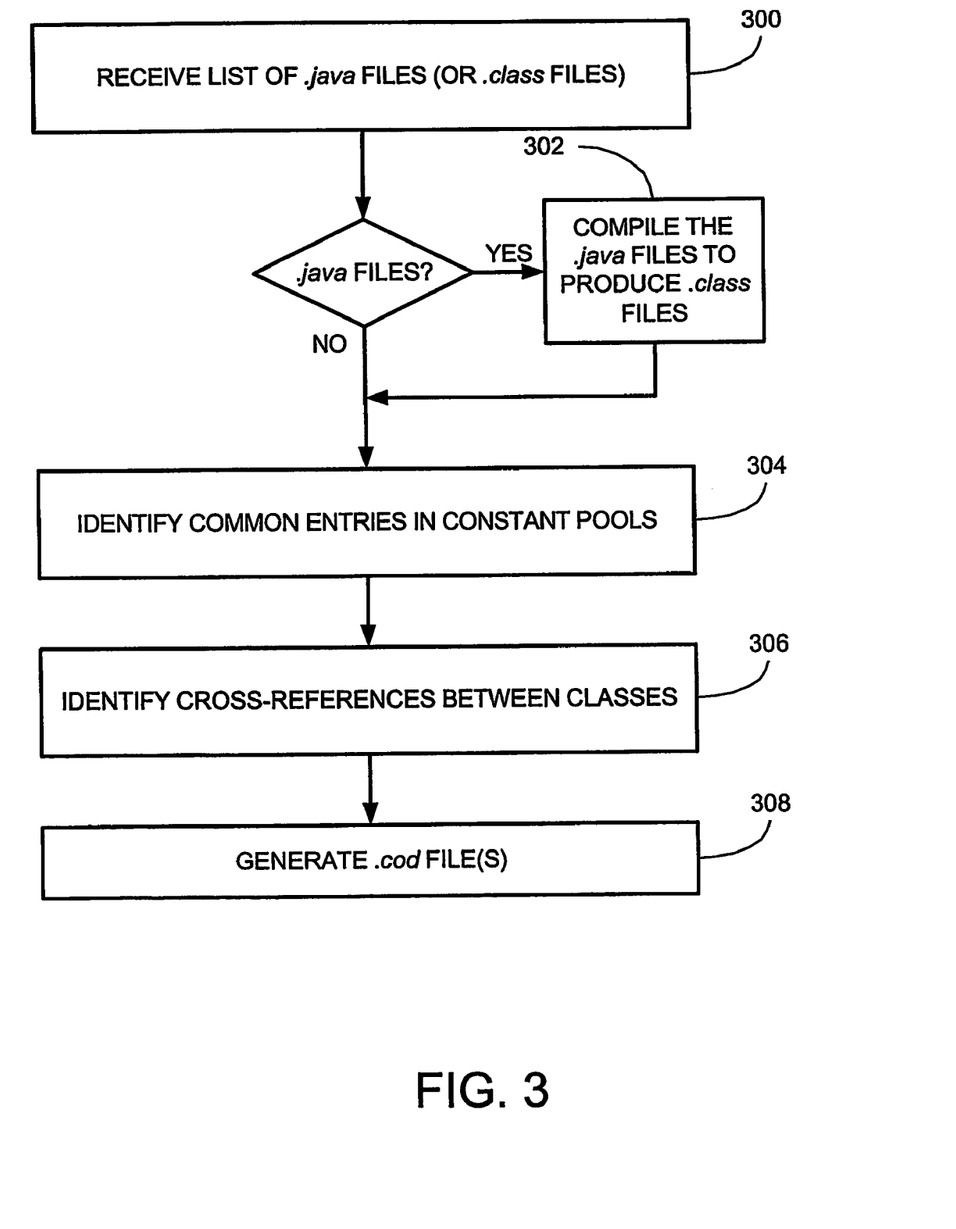
FIG. 3 is a flowchart illustration of a method for generating .cod files, according to some embodiments of the present invention.

FIG. 3 is a simplified flowchart illustration of a method for the generation of .cod files from a collection of .java files or .class files. The method may be performed by executable software on a general-purpose computer, the software being provided, for example, as part of a software developer's kit (SDK).

A list of .java files or .class files is received (step 300). If the input is .java files, then a Java compiler is applied to the .java files to produce corresponding .class files (step 302). Alternatively, although this is not shown in FIG. 3, one or more .jar files could be received, and information regarding the archived .class files could be extracted therefrom.

The executable software identifies common entries in the constant pools of the .class files (step 304). For example, in FIG. 1B, the parent class name character string "java/lang/Object", the method name character string "T" and the BaseType character "C" (representing the 'char' type) are common to Ee.class file 100E and to Ff.class file 100F.

The executable software identifies cross-references between classes, methods, and fields in the .class files (step 306). For example, in FIG. 1B, Method Ee.T is referenced by Method Ff.U.

The executable software then generates the .cod file by combining elements of the .class files (step 308). Unlike standard compression algorithms that compress data regardless of its content, the combination of elements of the .class files into the .cod file is performed differently based upon the type of element and its content. For example, the .cod file comprises a constant pool whose entries include the information stored in the constant pools of the .class files, but without duplications of redundant entries. In the generated .cod file, the constant pool contains only a single copy of the common entries identified in step 304. For example, in FIG. 2B, constant pool 222 of solo EeFf.cod file comprises only one instance of character strings "java/lang/Object" and "T" and one instance of BaseType character "C".

The executable software uses hard offsets in the generated solo .cod file for cross-references between classes and methods defined in the .class files being combined. For example, in FIG. 2B, the reference to Method Ee.T by Method Ff.U in the "byte codes and information structures" 224 comprises a hard offset, $HO_{Ee.T}$, specifying the location of the definition of Method Ee.T within solo EeFf.cod file 220. This hard offset does not need to be resolved or put into context by the Java VM at link time.

The above-described use of a hard offset in a .cod file may be contrasted with the use of offsets in Windows™ .DLL files. References in Windows™ .DLL files may be in terms of a symbolic name or an ordinal number. The ordinal number is used as an index into a table of offsets. Embodiments of the present invention use the hard offsets directly in the .cod file, giving a more compact representation. Moreover, Windows™ .DLL files are used for compiled code, while the .cod files are used for interpreted Java.

The executable software uses symbolic references in the generated solo .cod file for cross-references between the classes received in step 300 and other classes. In the present example, class Ee and class Ff extend java.lang.Object Therefore, constant pools 102E, 102F and 222 each comprise a single instance of class name "java/lang/Object" so that definitions of the classes may refer to this parent class. In solo EeFf.cod file 220, constant pool 222 comprises the string "java/lang/Object", and the reference to the java.lang.Object class in the definitions of the classes in "byte codes and information structures" 224 is a symbolic reference (using the index of the string in constant pool 222) that needs to be resolved by the Java VM at link time using information stored in fixup table 228.

The executable software may perform additional actions that have not been illustrated in FIG. 3. For example, other space-saving techniques may be used to further reduce the size of the solo .cod files.

It will be appreciated by persons of ordinary skill in the art that when either of the source code files Ee.java and Ff.java are modified, it is necessary to invoke the executable software to generate a new EeFf.cod file, or alternatively to invoke the executable software on the modified .java or .class files along with one or more additional .java or .class files to generate a new EeFf.cod file, where "x" indicates the additional classes.

It will also be appreciated by persons of ordinary skill in the art that if it were possible to generate a single solo .cod file for all the .class files to be used in a particular application, then the Java VM would not need to resolve symbolic references between classes, methods and fields, since all such references would appear in the .cod file as hard offsets. Moreover, such a .cod file might be significantly smaller than the total size of the .class files, since duplications of information in the .class files would be eliminated in the .cod file. Such a single .cod file would also be smaller than the multiple solo .cod files due to the reduction in duplicated information.

Figure 4:
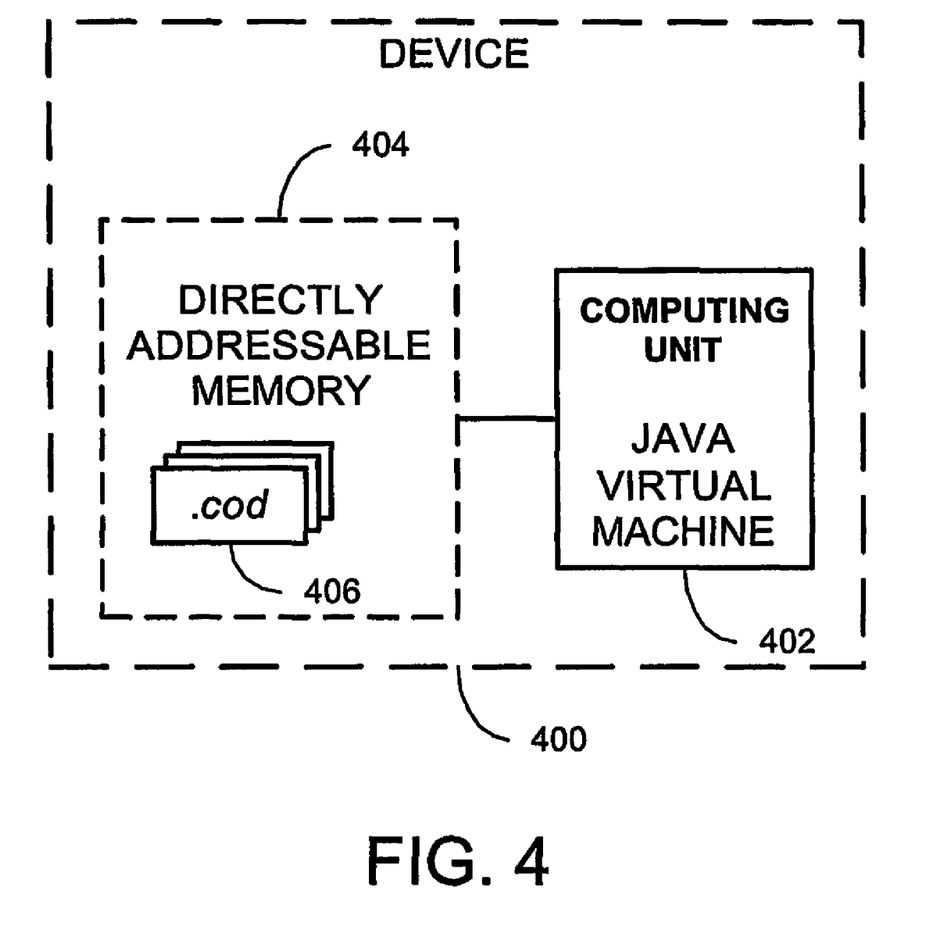
FIG. 4 is a simplified block-diagram illustration of a device having a computing unit and directly addressable memory, according to some embodiments of the present invention.

However, unlike Windows™ .DLL files, which are relatively unlimited in size, there are sometimes significant limitations on the size of a single .cod file. For example, FIG. 4 shows a device 400 comprising a computing unit 402 able to execute a Java VM and a directly addressable memory 404 having one or more .cod files 406 stored therein. Although the scope of the present invention is not limited in this respect, computing unit 402 may be a general-purpose microprocessor or any computing unit capable of executing a Java VM, and device 400 may be a digital camera, a handheld video recorder, a cellular telephone, a personal digital assistant, a handheld computer, an MP3 player, a CD player, a handheld gaming device, a pager, a two-way pager, etc. Although the scope of the present invention is not limited in this respect, directly addressable memory 404 may be not-OR (NOR) flash memory whose physical layout imposes an upper limit of 64 kiloBytes for the size of each .cod file stored therein.

If an application were to be stored exclusively as solo .cod files in a storage medium that imposes a limit on the size of individual .cod files, then each .cod file would likely comprise many symbolic references to account for the cross-references between classes in that .cod file and classes in other solo .cod files. Since symbolic references require more storage space in the .cod file than hard offsets, the overall size of the solo .cod representation of the application may be quite large.

As an alternative to the exclusive use of solo .cod files in the representation of an application, sibling .cod files may be used when the .cod files are to be stored in a storage medium that imposes a limit on the size of individual .cod files. The software developer may group together .java files or .class files into sibling groups. This grouping may be based on the software developer's knowledge of the intricacy of cross-references between the classes represented in the files. A .cod file may be generated from these .java files or .class files, and if, after a portion of the .java files or .class files have been combined into a .cod file, the size of the .cod file would exceed a predetermined limit if another .java or .class file were to be combined into the .cod file, then one or more sibling .cod files are created for the remaining .java files or .class files in the sibling group. Classes are not split across .cod file boundaries.

It will be appreciated by persons of ordinary skill in the art that for a given set of .class files, packing the .class files into two sibling .cod files will be a more compact representation than packing the .class files into three sibling .cod files. Therefore, it is desirable to pack the .class files in the group into as few .cod files as possible; while maintaining the constraint of individual .cod file size. The problem of how to divide a set of cross-referencing classes among sibling .cod files is similar to the well-known "packing problem" in the art of software engineering. Various techniques to minimize the overall size of the .cod representation of an application may be used.

FIG. 2A is a simplified illustration of two exemplary sibling .cod files according to some embodiments of the present invention. A sibling .cod file 200 is named "AaBb.cod" to signify that it results from combining the files Aa.class and Bb.class, although the scope of the present invention is not limited in this respect. Similarly, a sibling .cod file 210 is named "CcDd.cod" to signify that it results from combining the files Cc.class and Dd.class.

Each sibling .cod file comprises a list of its siblings. For example, a sibling list 206 of AaBb.cod file 200 comprises "CcDd" to indicate that CcDd.cod file 210 is a sibling of AaBb.cod file 200. Similarly, a sibling list 216 of CcDd.cod file 210 comprises "AaBb" to indicate that AaBb.cod file 200 is a sibling of CcDd.cod file 210.

Sibling AaBb.cod file 200 also comprises a constant pool 202, "byte codes and information structures" 204, and one or more fixup tables 208. Similarly, sibling CcDd.cod file 210 also comprises a constant pool 212, "byte codes and information structures" 214, and one or more fixup tables 218. The fixup tables 208, 218 may include indications of the places in the .cod file where resolution work is to be done by the Java VM at link time. The fixup tables may include pointers to the name of another .cod file, if necessary to the name of the class containing the symbol, if necessary to the name of the method or field within that class being referenced, and to method or field typing information.

FIG. 3 is a simplified flowchart illustration of a method for the generation of .cod files from a collection of .java files or .class files. The method may be performed by executable software on a general-purpose computer, the software being provided, for example, as part of a software developer's kit (SDK).

A list of .java files or .class files is received (step 300). If the input is .java files, then a Java compiler is applied to the .java files to produce corresponding .class files (step 302). Alternatively, although this is not shown in FIG. 3, one or more .jar files could be received, and information regarding the archived .class files could be extracted therefrom.

The executable software identifies common entries in the constant pools of the .class files (step 304).

The executable software identifies cross-references between classes, methods, and fields in the .class files (step 306).

The executable software then generates sibling .cod files by combining elements of the .class files (step 308). In the generated sibling .cod file, the constant pool contains only a single copy of the common entries identified in step 304. For example, in FIG. 2A, constant pool 202 of sibling AaBb.cod file 200 comprises only one instance of character strings "Bb" and "K" and one instance of BaseType character "T". In another example, constant pool 212 of sibling CcDd.cod file 210 comprises only one instance of character strings "Cc" and "P" and one instance of BaseType character "T".

The executable software uses hard offsets in the generated sibling .cod file for cross-references between classes whose .cod files are in the same sibling group. The executable software uses symbolic references in the generated sibling .cod file for cross-references between classes whose .cod files belong to different sibling groups, and between classes having solo .cod files.

This is better understood by way of examples:

1) As shown in FIG. 1A, Method Aa.G comprises a reference to Method Bb.K. Therefore, as shown in FIG. 2A, this reference appears in the definition of Method Aa.G in "byte codes and information structures" 204 of sibling AaBb.cod file 200 as a hard offset, $HO_{Bb.K}$, specifying the location of the definition of Method Bb.K within sibling AaBb.cod file 200. This hard offset does not need to be resolved or put into context by the Java VM at link time.

2) Similarly, as shown in FIG. 1B, Method Dd.Q comprises a reference to Method Cc.P. Therefore, as shown in FIG. 2A, this reference appears in the definition of Method Dd.Q in "byte codes and information structures" 214 of sibling CcDd.cod file 210 as a hard offset, $HO_{Cc.P}$, specifying the location of the definition of Method Cc.P within sibling CcDd.cod file 210. This hard offset does not need to be resolved or put into context by the Java VM at link time.

3) As shown in FIG. 1A, Method Bb.L comprises a reference to Method Cc.N. Therefore, as shown in FIG. 2A, this reference appears in the definition of Method Bb.L in "byte codes and information structures" 204 of sibling AaBb.cod file 200 as a hard offset, $HO_{Cc.N}$, specifying the location of the definition of Method Cc.N within sibling CcDd.cod file 210. This hard offset needs to be placed into context by the Java VM at link time using information stored in fixup table 208. For example, fixup table 208 may comprise a pointer to the name of sibling CcDd.cod file along with the location of the reference in Method Bb.L to Method Cc.N so that the Java VM knows which sibling .cod file contains Method Cc.N at the specified hard offset.

4) As shown in FIGS. 1A and 1B, Method Cc.M comprises a reference to Method Ff.U. The .cod file for class Ff is outside of the sibling group of CcDd.cod file 210. Therefore, as shown in FIG. 2A, this reference appears in the definition of Method Cc.M in "byte codes and information structures" 214 of sibling CcDd.cod file 210 as a symbolic reference to Method Ff.U and its argument(s). This symbolic reference needs to be resolved by the Java VM at link time using information stored in fixup table 218. For example, fixup table 218 may comprise a pointer to the name of the .cod file for the class where Method Ff.U is defined (e.g. "EeFf.cod"), a pointer to the name of the class where Method Ff.U is defined (e.g. "Ff"), a pointer to the name of the method (e.g. "U") and a pointer to the name of the method typing information (e.g. "I").

It will be appreciated by persons of ordinary skill in the art that when either of the source code files Cc.java and Dd.java are modified, it is necessary to invoke the executable software to generate a new CcDd.cod file, or alternatively to invoke the executable software on the modified .java or .class files along with one or more additional .java or .class files to generate a new CcDdx.cod file, where "x" indicates the additional classes. If a new CcDd.cod file or a new CcDdxxx.cod file has been generated, then the hard offset $HO_{Cc.N}$ appearing in resolved AaBb.cod file 200 no longer accurately describes the location of the byte codes and other information for Method N in the new CcDd.cod file or a new CcDdxxx.cod file.

Accordingly, when a .cod file is updated, all of its sibling .cod files are updated simultaneously. Although the scope of the present invention is not limited in this respect, this is generally done by taking the entire set of .class files and regenerating all the output sibling .cod files. Since some of the classes have changed, the division of classes among the newly generated sibling .cod files may be different from that in the original sibling .cod files.

While certain features of the invention have been illustrated and described herein, many modifications, substitutions, changes, and equivalents will now occur to those of ordinary skill in the art It is, therefore, to be understood that the appended claims are intended to cover all such modifications and changes as fall within the true spirit of the invention.

What is claimed is:

1. A device comprising:
a memory unit including executable software;
a plurality of class files stored in the memory unit; and,
a computing unit connected to the memory unit, the computing unit being able to execute a Java Virtual Machine, the computing unit configured to generate two or more files from the plurality of class files by combining elements from the plurality of class files without duplication of entries for reducing storage space;
wherein the generated files are directly interpretable by the Java Virtual Machine;
wherein the number of the generated files is less than the number of the plurality of class files;
wherein a given generated file comprises:
a constant pool created by combining constant pool entries from two or more of the plurality of class files without duplication of entries;
a byte codes and information structure created by combining byte codes and information structure entries from the two or more of the plurality of class files; and,
a fixup table for providing information to the Java Virtual Machine, wherein the Java Virtual Machine uses the information in the fixup table to resolve at least one entry in the given generated file at link time;
wherein at least two of the generated files are generated as sibling files in a common sibling group;
wherein each of the sibling files comprises a sibling list for listing other sibling files in the common sibling group;
wherein cross-references between the sibling files in the common sibling group are indicated using hard offsets; and
wherein references to files that are not part of the common sibling group are indicated using symbolic references.

2. The device of claim 1, wherein the information in the fixup table comprises the location of data needed for resolving a symbolic reference in the given generated file.

3. The device of claim 1, wherein for the given generated file, the byte codes and information structure comprises a second hard offset for cross-referencing a method included in the given generated file that was previously symbolically referenced.

4. The device of claim 1, wherein at least one of the hard offsets does not need to be resolved or put into context by the Java Virtual Machine at link time.

5. The device of claim 1, wherein the information in the fixup table of a given sibling file comprises the location of data of a cross-referenced sibling file to place one of the hard offsets that corresponds to the cross-referenced sibling file into context at link time.

6. The device of claim 1, wherein as few sibling files are generated as possible while satisfying a constraint on individual generated file size.

7. A method of generating sibling files, the method comprising:
generating two or more files from a plurality of class files having constant pools on a computing unit by combining elements from the plurality of class files without duplication of entries for reducing storage space, wherein the generated files are directly interpretable by a Java Virtual Machine, and wherein the number of the generated files is less than the number of the plurality of class files;

wherein said generating two or more files comprises, for a given generated file:

identifying class files with common entries in the constant pools of the class files;

generating a constant pool for the given generated file by combining constant pool entries from the plurality of class files with common entries without duplication;

generating the byte codes and information structure for the given generated file by combining byte codes and information structure entries from the plurality of class files; and, generating a fixup table for providing information to the Java Virtual Machine, wherein the Java Virtual Machines uses the information in the fixup table to resolve at least one entry in the given generated file at link time;

wherein at least two of the generated files are generated as sibling files in a common sibling group by providing a sibling list for each of the sibling files listing other sibling files in the common sibling group;

wherein cross-references between the sibling files in the common sibling group are indicated using hard offsets; and wherein references to files that are not part of the common sibling group are indicated using symbolic references.

8. The method of claim 7, wherein the method further comprises providing location of data needed for resolving a symbolic reference in the given generated file as the information in the fixup table.

9. The method of claim 7, wherein the method further comprises, for the given generated file, providing a second hard offset in the byte codes and information structure for cross-referencing a method now included in the given generated file that was previously symbolically referenced.

10. The method of claim 7, wherein the method further comprises providing at least one of the hard offsets in a manner that does not need to be resolved or put into context by the Java Virtual Machine at link time.

11. The method of claim 7, wherein the method further comprises providing the location of data of a cross-referenced sibling file as the information in the fixup table of a given sibling file to place one of the hard offsets that corresponds to the cross-reference sibling file into context at link time.

12. The method of claim 7, wherein the method further comprises generating as few sibling files as possible while satisfying a constraint on individual generated file size.

13. A storage medium storing computer executable instructions that when executed by a computing unit, configure the computing unit to:

generate one or more files from a plurality of class files by combining elements from the plurality of class files without duplication of entries for reducing storage space, wherein the generated files are directly interpretable by a Java Virtual Machine, and wherein the number of the generated files is less than the number of the plurality of class files;

wherein a given generated file comprises:

a constant pool created by combining constant pool entries from two or more of the plurality of class files without duplication of entries;

a byte codes and information structure created by combining byte codes and information structure entries from the two or more of the plurality of class files; and, a fixup table for providing information to the Java Virtual Machine, wherein the Java Virtual Machine uses the information in the fixup table to resolve at least one component of the given generated file at link time;

wherein at least two of the generated files are generated as sibling files in a common sibling group;

wherein each of the sibling files comprise a sibling list for listing other sibling files in the common sibling group;

wherein cross-references between the sibling files in the common sibling group are indicated using hard offsets; and wherein references to files that are not part of the common sibling group are indicated using symbolic references.

14. The storage medium of claim 13, wherein the information in the fixup table comprises the location of data needed for resolving a symbolic reference in the given generated file.

15. The storage medium of claim 13, wherein for the given generated file, the executable software comprises code for generating a second hard offset in the byte codes and information structure for cross-referencing a method included in the given generated file that was previously symbolically referenced.

16. The storage medium of claim 13, wherein for the given generated file, at least one of the hard offsets does not need to be resolved or put into context by the Java Virtual Machine at link time.

17. The storage medium of claim 13, wherein the information in the fixup table of a given sibling file comprises the location of data of a cross-referenced sibling file to place one of the hard offsets that corresponds to the cross-referenced sibling file into context at link time.

18. The storage medium of claim 13, wherein as few sibling files are generated as possible while satisfying a constraint on individual generated file size.

* * * * *